United States Patent Office 3,241,030
Patented Mar. 15, 1966

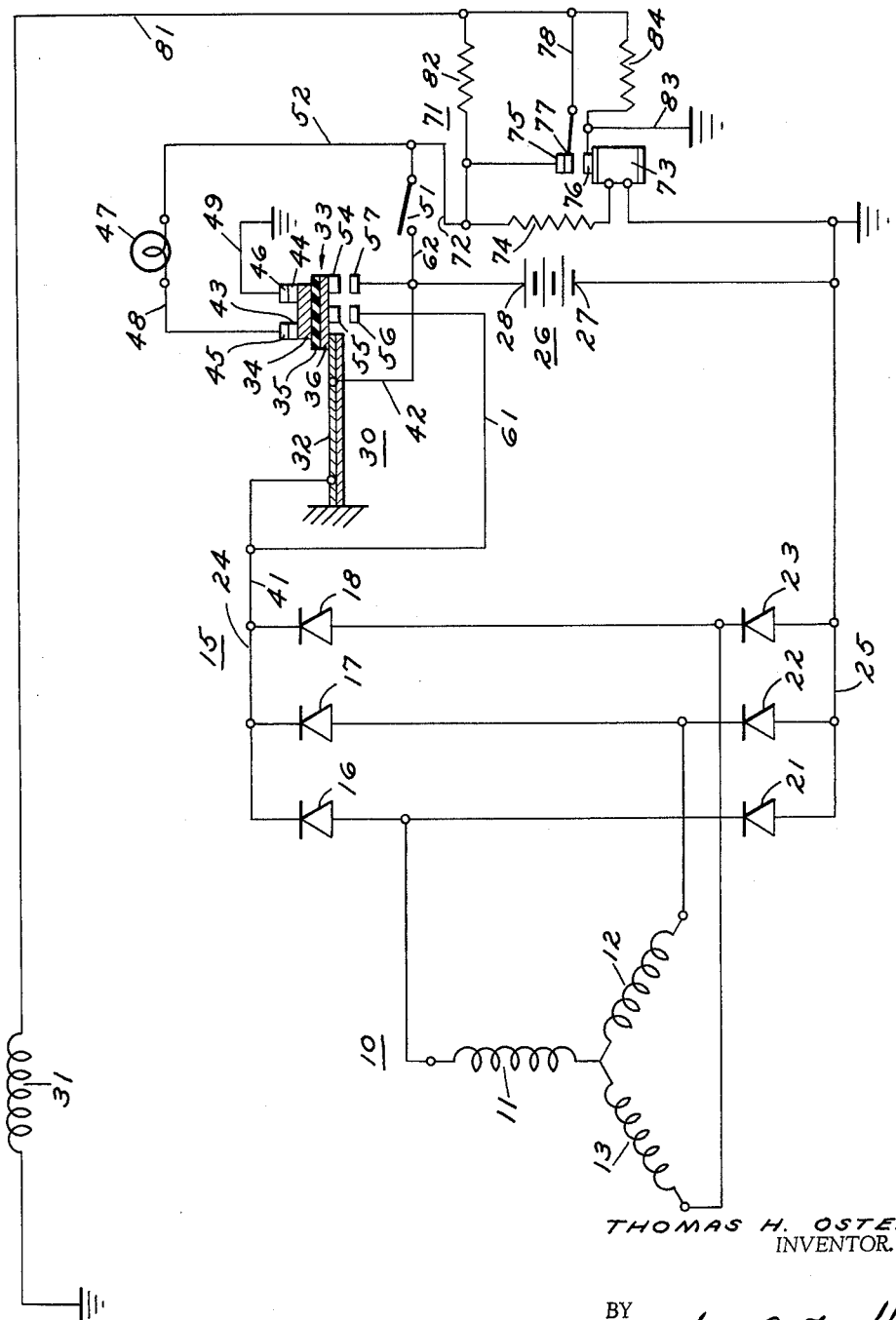

3,241,030
WARNING SIGNAL CIRCUIT FOR AN ALTERNATOR
Thomas H. Oster, Dearborn, Mich., assignor to Ford Motor Company, Dearborn, Mich., a corporation of Delaware
Filed Dec. 7, 1961, Ser. No. 157,789
2 Claims. (Cl. 320—48)

This invention relates to an automotive vehicle electrical generating system employing an alternator and more particularly to means employed with the alternator to give a warning signal when the alternator is producing insufficient voltage to charge the storage battery of the vehicle.

In a conventional automotive vehicle electrical generating system, a direct current generator is employed to charge the vehicle storage battery and to provide electrical energy for the electrical loads of the vehicle. In such a system is is necessary to employ a cutout relay to prevent current flow from the storage battery to the generator when the output voltage of the generator is below the terminal voltage of the battery. This same system employs a warning lamp operated by the cutout relay to provide an indication or warning when the output voltage of the generator is below the terminal voltage of the battery.

In this invention an alternator is employed as the generator of electrical energy, and a rectifier composed of a plurality of diodes is employed to rectify the alternating current output. The diodes have a reverse resistance sufficiently high to prevent current flow from the battery to the alternator when the voltage output of the alternator is below the terminal voltage of the battery. The cutout relay employed in conventional systems is no longer needed and hence a new means must be devised to operate the warning device of the alternator.

The applicant has devised such a new means for operating the warning device of the alternator that is uncomplicated and inexpensive. In the invention this means preferably takes the form of a bimetal switch positioned in series with the rectifier of the alternator and the electrical storage battery of the vehicle. This bimetal switch means has a group of contacts that are normally closed and that complete a circuit between the storage battery and a warning lamp when the output voltage of the alternator is below the terminal voltage of the battery. When the output voltage of the alternator rises above the terminal voltage of the battery, the current flow from the alternator to the battery and other electrical loads provides sufficient energy to open the bimetal switch. This opens the circuit to the alternator warning lamp thereby extinguishing it. The bimetal switch may also carry a second group of contacts that close when the contacts connected to operate the warning lamp open. The closing of this second group of contacts connects a high capacity shunt around the bimetal switch and in series with the rectifier and the electrical storage battery. This shunt makes it possible to carry full charging current without overheating the bimetal which must be sufficiently sensitive to flex under the few amperes required to supply the field of the alternator and the ignition system of the vehicle.

The bimetal switch means employed eliminates the flickering of the warning lamp commonly encountered in conventional generator systems when the output of the generator momentarily falls below the terminal voltage of the battery. This is true since the bimetal switch means is capable of storing a certain amount of thermal energy over short time intervals and will not instantaneously energize the warning lamp when the output voltage of the alternator falls below the terminal voltage of the battery.

An object of the invention is the provision of a heat responsive means operated by the current produced by an alternator for indicating a condition in which the output voltage of the alternator is lower than the terminal voltage of a vehicle storage battery.

Another object of the invention is the provision of a simple and inexpensive means for operating the warning lamp of an automotive vehicle alternator.

A further object is the provision of a means for operating the warning lamp of an automotive vehicle alternator that eliminates flickering of the lamp commonly associated with conventional automotive vehicle generating systems.

Other objects and attendant advantages of this invention will become more readily apparent as the specification is considered in connection with the attached drawings in which:

The single figure is an electrical circuit diagram of the invention.

Referring now to the drawing, there is shown an alternator 10 having Y connected output windings 11, 12 and 13. Although a Y connected alternator is shown, it will become apparent to those skilled in the art that a delta connected alternator could be equally well employed. A rectifier 15, comprised of diodes 16, 17, 18, 21, 22, and 23, is connected to the alternator 10 for rectifying the electrical output of the windings 11, 12, and 13. These diodes, preferably silicon diodes, have a reverse resistance sufficiently high to substantially prevent reverse current flow from the battery of the vehicle to the alternator when the output voltage of the alternator is below the terminal voltage of the battery.

The rectifier 15 includes output terminals 24 and 25, and a storage battery 26 has its negative terminal 27 connected to terminal 25 of the rectifier. The positive terminal 28 of the storage battery 26, is adapted to be connected to the positive terminal 24 of the rectifier through a circuit about to be described. This circuit includes heat responsive switch means 30 operated by current flow from the alternator to the battery and other electrical loads, such as, the field winding 31 of the alternator, for de-energizing a warning lamp or indicating means when the output voltage of the alternator exceeds the terminal voltage of the battery.

The heat responsive switch means 30 preferably comprises a bimetal strip 32 anchored at one end and having a multi-layered construction 33 mounted on the other end. This multi-layered construction comprises an upper metallic layer 34, an intermediate layer of insulating material 35, and a lower metallic layer 36. The bimetal strip is connected at one end through a lead 41 to the positive terminal 24 of the alternator 10. At the other end the bimetal strip is connected through a lead 42 to the positive terminal 28 of electrical storage battery 26.

The upper metallic layer 34 of the multi-layered construction 33 carries a pair of electrical contacts 43 and 44 that are adapted to engage contacts 45 and 46. The contact 45 is connected to an alternator warning device, preferably a warning lamp 47, through a lead 48, while contact 46 is connected to ground through a lead 49. The alternator warning lamp 47 is also connected to an ignition switch 51 by a lead 52.

The lower metallic layer 36 of the multi-layered construction 33 includes a pair of contacts 54 and 55. The contact 55 is adapted to engage a contact 56 while the contact 54 is adapted to engage a contact 57. A high capacity shunt 61 is connected to the contact 56 and to the positive terminal 24 of the rectifier 15 through the lead 41. Contact 57 is connected to the positive terminal 28 of the battery 26 and is connected through a lead 62 to the ignition switch 51. This lead also connects the ignition switch with the positive terminal 28 of the storage battery.

A conventional double contact voltage limiter 71 is connected to the ignition switch 51 through a lead 72. This voltage limiter includes a relay having a winding 73 connected in series with a resistor 74. This series circuit is connected across the output terminals of the rectifier 15 and the terminals of the storage battery 26. The voltage limiter also includes a first stationary contact 75, a second stationary contact 76, and a movable contact 77. The movable contact 77 is connected to the field winding 31 through leads 78 and 81, while stationary contact 75 is connected to lead 81 and hence field winding 31 through a resistor 82. The stationary contact 76 is connected to ground by a lead 83, and is also connected to lead 81 and hence field winding 31 through a resistor 84.

The voltage limiter 71 operates in a conventional fashion and when the output of the alternator exceeds the terminal voltage of the battery 26 by a selected level, movable contact 77 will vibrate between an open and closed position with respect to contact 75 thereby alternately inserting resistor 82 into the energizing circuit for the field winding 31. When the output voltage rises to another higher selected level, the contacts 77 and 76 will alternately open and close thereby alternately energizing the field winding 31 through resistor 82 and alternately grounding the normally energized side of the field winding through the resistor 84. Although a conventional double contact electromechanical voltage limiter has been illustrated and described, it is evident that any suitable voltage limiter, for example a transistorized voltage limiter, could be equally well employed with the invention.

The single figure of the drawing discloses the circuit and the alternator in the unenergized or at rest position. When the ignition switch 51 is closed, one terminal of the warning lamp 47 will be connected to the positive terminal 28 of battery 26, through lead 62, switch 51, and lead 52. The other terminal of the warning lamp 47 will be connected to ground through lead 48, contact 45, contact 43, metallic layer 34, contact 44, contact 46, and lead 49. When the ignition switch is initially closed, therefore, the alternator warning lamp 47 will be energized.

Prior to the time the alternator produces a voltage output in excess of the terminal voltage of the battery 26, the field winding 31 will be energized by the battery 26 through the lead 62, ignition switch 51, lead 72, normally closed contacts 75 and 77, lead 78, and lead 81. During this time, the diodes 16, 17, 18, 21, 22 and 23 prevent current flow from the battery back through the alternator. It follows, therefore, that no current will flow through the bimetal strip 32 when the output voltage of the alternator is below the terminal voltage of the battery. When the terminal voltage of the alternator appearing across the terminals 24 and 25 of the rectifier 15 exceeds the terminal voltage of the battery 26, current will flow from the alternator to the storage battery via the thermally responsive switch means 30. This current flow takes place from terminal 24 through lead 41, through the bimetal strip 32 and through lead 42 to the positive terminal 28 of the battery, and to the field winding 31 through the circuit previously described. The current flow through the bimetal strip will heat this element and the end carrying the multi-layered construction will move downwardly. This will break the connection between contacts 45 and 43 and between contacts 46 and 44, thereby opening the circuit to the alternator warning lamp 47 and extinguishing it. Simultaneously, contact will be made between contacts 55 and 56 and between contacts 54 and 57, thereby connecting the high capacity shunt 61 to the output terminal 24 of the rectifier and to the positive terminal 28 of the battery 26.

The bimetal strip 32 as shown is directly heated by current passing through it, but an indirectly heated bimetal element, one heated by a resistor, could be employed with equal facility. In this case the resistor would be connected between the terminal 24 of the rectifier and the positive terminal 28 of the battery.

It is evident that when the high capacity shunt 61 is connected between the output terminal 24 of the rectifier and the positive terminal 28 of the battery, the current flow through the bimetal strip 32 will be reduced. This reduction in current flow may permit the bimetal strip to cool sufficiently to permit the contacts 55 and 56, and contacts 54 and 57 to open. The opening of these contacts will again cause full charging current to flow through the bimetal strip 32 thereby heating the strip sufficiently to again close the contacts 54 and 57, and contacts 55 and 56. This cycle may be repeated rapidly so that the bimetal strip may oscillate to cyclically open and close contacts 54 and 57 and contacts 55 and 56. The bimetal switch means is designed, however, with a sufficiently large thermal time constant to prevent the contacts 43 and 45 and contacts 44 and 46 from coming into engagement during these oscillations. Thus the alternator warning lamp 47 will remain deenergized even though the bimetal strip 32 oscillates sufficiently to open and close contacts 55 and 56 and contacts 54 and 57.

As previously stated, the thermal time constant of the bimetal switch means is made sufficiently large to prevent the energizing of the alternator warning lamp 47 when oscillations of the bimetal strip 32 occur. This time constant should be made large enough to prevent the contacts 43 and 45 and the contacts 44 and 46 from closing when the output voltage of the alternator fluctuates between a value just above and a value just below the terminal voltage of the battery. This will keep the contacts 43 and 45 and the contacts 44 and 46 open during these fluctuations and hence the warning lamp 47 of the alternator will remain deenergized until the output voltage of the alternator remains below the terminal voltage of the battery for a time interval in excess of the thermal time constant of the bimetal switch means. This mode of operation provides the vehicle operator with an indication when the output voltage of the alternator is below the terminal voltage of the battery for a sufficient period to cause any damage to the generating and battery system of the vehicle. This is accomplished without the flickering of the warning light that occurs in conventional systems when output voltage of the generator hovers at a value approximately equal to the terminal voltage of the battery.

Thus, the present invention provides an uncomplicated and inexpensive means for operating the warning lamp of an automotive vehicle alternator. This means employs a heat responsive means responsive to current produced by the alternator for indicating a condition in which the output of the alternator is insufficient to charge the vehicle storage battery.

It will be understood that the invention is not to be limited to the exact construction shown and described and that various changes and modifications may be made without departing from the spirit and scope of the invention, as defined in the appended claims.

I claim:
1. In an electrical generating system for an automotive vehicle, the combination comprising, an alternator, a rectifier connected to rectify the output of said alternator, a storage battery connected to the output of said rectifier, said rectifier having a reverse resistance sufficiently high to prevent current flow from said electrical storage battery to said alternator, a warning lamp connected in circuit with said storage battery and said alternator, and bimetal switch means connected in circuit with said warning lamp and actuated by current flow from said rectifier to said storage battery for extinguishing said warning lamp, and shunt means connected between said rectifier and said bat- tery upon actuation of said bimetal switch means for shunting a substantial portion of the current flow from said rectifier to said battery around said bimetal switch means.

2. In an electrical generating system for an automotive vehicle, the combination comprising, an alternator, a rectifier connected to rectify the output of said alternator, a storage battery adapted to be connected to the output of said rectifier, said rectifier having a reverse resistance sufficiently high to prevent current flow from the battery to the alternator when the rectified output voltage of the alternator is below the terminal voltage of the battery, a warning lamp, a bimetal switch means, said bimetal switch means including a flexible bimetal strip connected in series with said rectifier and said battery, a first group of contacts that are normally closed and a second group of contacts that are normally open when the output voltage of the rectifier is below the terminal voltage of the battery, said first group and said second group of contacts being carried by said bimetal strip, said warning lamp being connectable to said battery through said first group of contacts, a high capacity shunt connected to the rectifier and connectable to said battery though said second group of contacts, said bimetal strip being capable of flexing sufficiently to open said first group of contacts and to close said second group of contacts when current flows through said bimetal strip as the result of the output voltage of the alternator exceeding the terminal voltage of the storage battery whereby said warning lamp is disconnected from said battery and said high capacity shunt is connected between said rectifier and said storage battery in parallel with said bimetal strip.

References Cited by the Examiner
UNITED STATES PATENTS

| | | | |
|---|---|---|---|
| 2,908,854 | 10/1959 | Rice | 320—48 X |
| 2,955,245 | 10/1960 | Payne et al. | 320—35 |
| 3,022,456 | 2/1962 | Larson et al. | 322—99 X |
| 3,076,127 | 1/1963 | Grecu | 320—36 |

MILTON O. HIRSHFIELD, *Primary Examiner*.

LLOYD McCOLLUM, *Examiner*.